INVENTORS
EDWARD J. VOITAS & GEORGE G. HART
BY
Barnes, Kisselle, Raisch & Choate
ATTORNEYS

FIG. 8

INVENTORS
EDWARD J. VOITAS & GEORGE G. HART
BY
Barnes, Kisselle, Raisch & Choate
ATTORNEYS

United States Patent Office 3,333,787
Patented Aug. 1, 1967

3,333,787
CENTRAL EXCHANGER FOR PNEUMATIC TUBE SYSTEM
Edward J. Voitas, Oakland, N.J., and George G. Hart, Wayne, Mich.; said Hart assignor to The Grover Company, Detroit, Mich., a corporation of Michigan
Filed June 10, 1965, Ser. No. 470,662
17 Claims. (Cl. 243—16)

This invention relates to a device for transferring individually propelled carriers from one conduit to another conduit in a pneumatic tube system and the like and in particular to a central exchanger and the controls therefor for transferring carriers from an incoming conduit or loop to an outgoing loop which is predesignated on the carrier.

Pneumatic tube conveyor systems may have a a large number of loops, each loop having a plurality of stations. Each loop connects with a central exchanger or transfer device which receives incoming carriers and dispatches them to outgoing loops. It is particularly desirable that the central exchanger and controls therefor be engineered so that the exchanger adapts easily to various applications depending on the number of incoming and outgoing loops and stations. It is also desirable that the central exchanger have minimum size without detracting from effective operation. Transfer should be accomplished at a maximum rate without any jamming of carriers in the exchanger. The exchanger and controls therefor should be constructed simply and economically for a particular installation.

The objects of this invention are to provide a central exchanger and controls therefor having the above desirable characteristics.

In the drawings:

FIGS. 8, 9 and 10 are circuit diagrams of the controls shown in FIG. 7.

Figure 1:
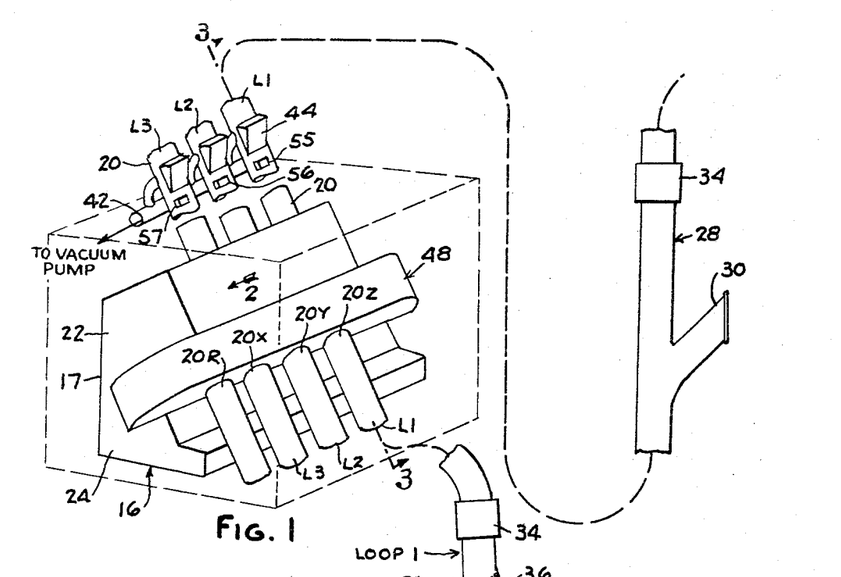
FIG. 1 is a diagrammatic perspective view of a portion of a three-loop pneumatic tube system having a central exchanger constructed in accordance with the present invention.

A central exchanger 16 comprises an inner housing 17. Three pneumatic tubes 20, 20b and 20c enter the upper portion 22 of exchanger 16 and serve as inputs to the exchanger. Four additional pneumatic tubes 20x, 20y, 20z and 20r leave the lower portion 24 of exchanger 16 and serve as outputs from the exchanger. Tube 20r is a reject output, whereas tubes 20x, 20y and 20z are connected respectively to tubes 20a, 20b, 20c to form pneumatic circuit loops L1, L2 and L3. It is not essential that the tubes be interconnected to form such loops, but this is preferred. Loop L1 is shown schematically in FIG. 1, and since loops L2 and L3 are like loop L1, they have not been shown. Each loop may have parallel branch paths if desired. Loop L1 includes a dispatcher station 30 for sending a carrier 40 (FIG. 6) through the system, and a receptor station 32 for receiving a carrier 40 from the system. In a working system, there may be several dispatcher and receptor stations, and each receptor station has a selector control 34 including a flap valve 36 which can be operated by a solenoid to direct a carrier 40 from the system into the associated station. Connected to each of the inlet tubes 20a, 20b, 20c adjacent exchanger 16 is a vacuum supply pipe 42 for evacuating the tubes to propel carrier 40 therethrough and a flap valve 44 which isolates exchanger 16 from vacuum pipe 42 but permits a carrier to pass downwardly therethrough.

Except for exchanger 16, the controls therefor, and the connection thereof in the system, the components of the pneumatic tube system described herein are generally conventional. Pneumatic tube conveyor systems having some similar components are disclosed in United States Patents Nos. 198,342, D. E. Chambers; 2,085,265, Mauch et al.; 2,241,917, Mahlis et al.; and 2,773,658, W. M. Van Oteron et al. Exchanger 16 transfers an incoming carrier 40 from one of tubes 20x, 20y and 20z to a preselected one of tubes 20a, 20b and 20c in accordance with a loop designation preset on the carrier 40 before it was placed into one of the dispatchers 30. Carriers 40 entering exchanger 16 are received and stored in the upper portion 22 to await processing. Preselected loop and station designations are read by and stored in a control circuit (FIGS. 7–10) while the carrier moves from the upper portion 22 to the lower portion 24. Carriers 40 are transferred laterally from one of the incoming tubes to the preselected outgoing tube by an endless chain conveyor 48 (FIG. 5) located in the lower portion 24 of exchanger 16. Disposed below conveyor 48 and overlying outgoing tubes 20x, 20y, 20z and 20r is a retractable slidegate 49 which releases carriers 40 from conveyor 48 into the outgoing tubes and the reject tube.

Figures 4, 6:
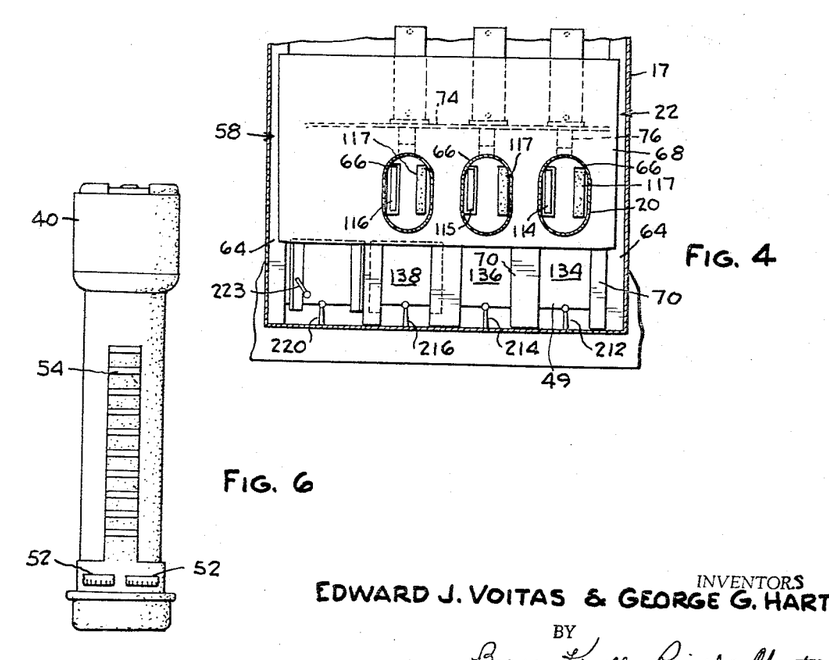
FIG. 4 is a generally horizontal section taken on line 4—4 of FIG. 2 to illustrate the upper portion of the exchanger where incoming carriers are stored and processed.
FIG. 6 illustrates a carrier used in the pneumatic tube system shown in FIG. 1.

Although the particular type of carrier and the way in which loop and stations are designated on the carrier are not essential to the present invention, for purposes of illustration, loop and station designations are preselected on carrier 40 by a pair of rotatable contact dials 50, 52, respectively, bearing appropriate designations (FIG. 6). Carrier 40 also has nine fixed contact rings 54 corresponding to a particular number of loops and stations. A different one of the rings 54 is electrically connected to each ring 50, 52 depending on the position at which rings 50, 52 are set. The preselected loop and station information is read from rings 50, 52, 54 by suitable contact brushes at exchanger 16 and at stations 26, 28. Further details of particular brush-contact carrier systems may be found in the aforementioned Mahlis et al. 2,241,917 and Mauch 2,085,265 patents, and in a pneumatic tube system presently sold commercially by applicant's assignee, The Grover Company, under the mark "Brushomatic."

Referring again to exchanger 16, a respective limit switch 55, 56, 57 (FIG. 1) is mounted in each of the tubes 20a, 20b and 20c. These limit switches indicate when more than one carrier is stacked up and awaiting processing in any of the loops L1, L2, L3. Housing 17 comprises a rigid box-like frame 58 (FIGS. 3 and 4) on which a generally horizontal shelf 60 (FIGS. 2 and 3) is supported in the upper portion 22 of housing 17 by lateral and end beams 62, 64. Shelf 60 (FIG. 3) is spaced below the lower open end 66 of each of the input tubes 20, a distance slightly greater than the length of carrier 40. The lower ends 66 of tubes 20a, 20b, 20c are supported by an upper shelf 68 mounted on frame 58. Mounted on shelves 60, 68 are four vertical dividers 70 (FIG. 2) extending rearwardly from the front of housing 17 and spaced horizontally along shelves 60, 68 to form three compartments 71, 72, 73 vertically in line with a respective one of the incoming tubes 20a, 20b, 20c.

The rear of compartments 71, 72, 73 is closed by a vertical plate 74 mounted on shelves 60, 68. Three plungers or release arms 76 are mounted on plate 74 and disposed in a respective one of the compartments 71, 72, 73. Each arm 76 is as tall as compartments 71, 72, 73 and is generally parallel to a respective one of the tubes 20. At the top and bottom of each arm 76 are integral, right-angled legs 78 that ride in guides 80 (FIGS. 2 and 3) on shelves 60, 68. Plate 74 is apertured as at 82 (FIG. 3) to accommodate legs 78 for movement therethrough. Arms 76 are moved in a direction generally upwardly and to the right as viewed in FIG. 3, in the direction of the arrow 84, by a respective air cylinder 86 mounted on plate 74. Each air cylinder 86 has a piston 88 and piston rod 90 which is slidable through plate 74 and connected to a respective arm 76 at its outer end. Each of the cylinders 86 is operated by a respective air valve 92 having a control member 94 which is moved by a link 96 operated by a solenoid coil 98. At the bottom of each compartment 71, 72, 73 is a limit switch 114, 115, 116, respectively (FIGS. 2, 3 and 4), and a yieldable bumper 117 mounted on shelf 60 in spaced-apart relation to permit movement of arms 76 therebetween.

Mounted on each divider 70 forward (to the right as viewed in FIG. 3) of tubes 20 is a brush assembly 120 having two brushes 122, 123 (FIGS. 3 and 8) spaced closely together and nine contact brushes 124 in line and spaced vertically along assembly 120. Brushes 122, 123, 124 extend outward from dividers 70 into compartments 71, 72, 73 (FIG. 2) so that as a carrier 40 is ejected from one of the compartments 71, 72, 73 by release arms 76, brushes 122, 123 will contact selector rings 50, 52 on the carrier 40 and brushes 124 will contact a respective one of the contact rings 54. Each compartment 71, 72, 73 is open at its lower forward portion, to the right of shelf 60 and brush assemblies 120 as viewed in FIG. 3, to form three outlets 134, 136, 138 (FIGS. 2, 3 and 4) for conducting carriers from the compartments in the upper portion 22 downwardly to the conveyor 48 in the lower portion 24 of housing 17.

Figure 3:
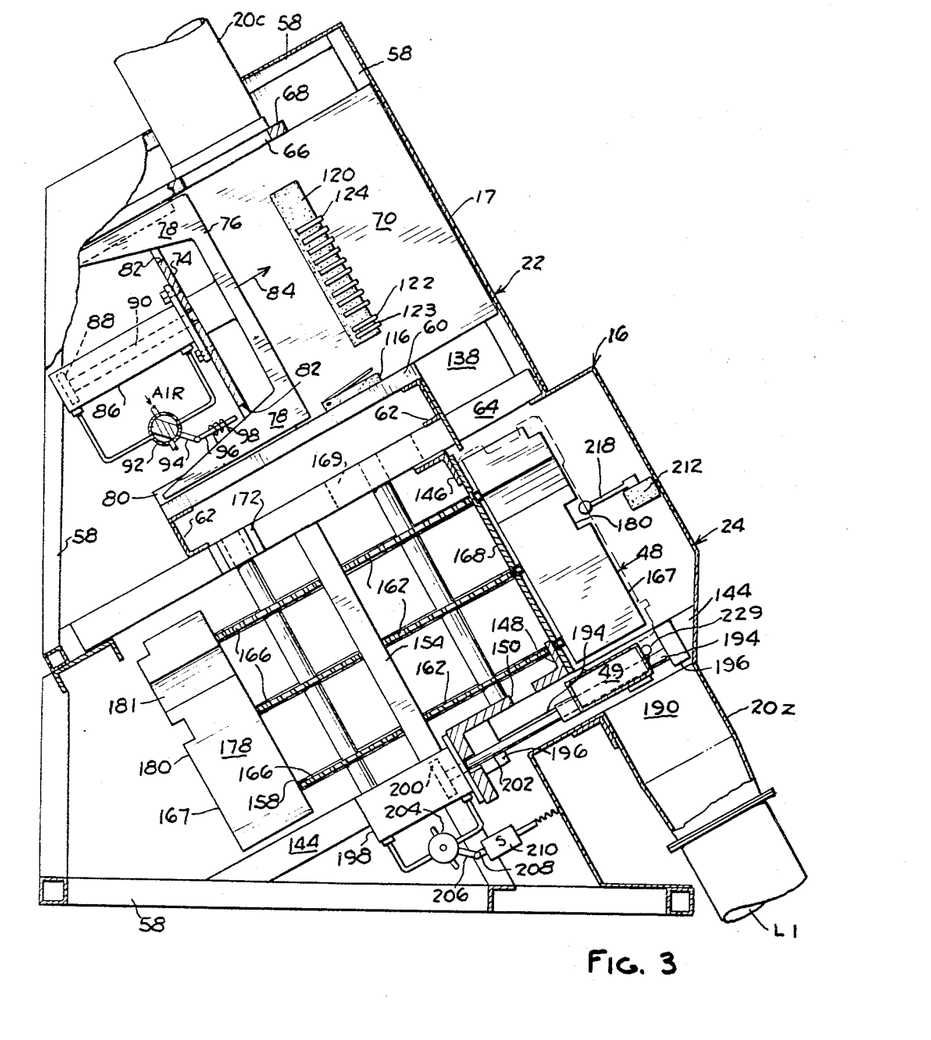
FIG. 3 is a vertical section taken on line 3—3 of FIG. 2.
Figure 5:
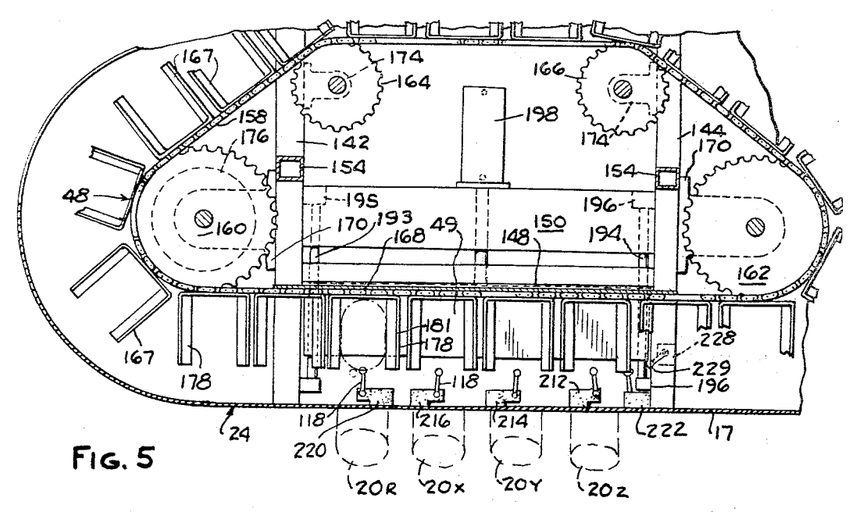
FIG. 5 is a generally horizontal section taken on line 5—5 of FIG. 2 to illustrate the lower portion of the exchanger where carriers are transferred to a predesignated outgoing loop by a laterally moving conveyor.

Conveyor 48 is supported on frame 58 in the lower portion 24 of housing 16 beneath shelf 60 by beams 64 (FIGS. 3 and 4), a pair of lower end beams 142, 144 (FIG. 5), a pair of upper and lower lateral beams 146, 148 (FIG. 3), a lateral beam 150, and a pair of generally vertical end beams 154 (FIGS. 3 and 5). Conveyor 48 generally comprises an endless flexible chain conveyor 158 which is supported on a pair of horizontally spaced main shafts with sprockets 160, 162 and a pair of idler shafts with sprockets 164, 166 so as to pass beneath outlets 134, 136, 138. Mounted on chain conveyor 158 around the outer periphery thereof are a plurality of open-ended, U-shaped, separators 167 (FIG. 5) spaced so as to register with outlets 134, 136, 138. A flat plate 168 (FIGS. 3 and 5) extends vertically between and is fastened to lateral beams 146, 148. Plate 168 extends laterally or horizontally between end beams 142, 144 to substantially close the space between main shaft sprockets 160, 162 and serve as a guide for chain conveyor 158 as it moves under outlets 134, 136, 138. Each main shaft sprocket 160, 162 is rotatably supported by an upper pillow block bearing 169 (FIG. 3) mounted on one of the beams 64, and a lower pillow block bearing 170 (FIG. 5) mounted on beams 142, 144, respectively. Idler shaft sprockets 164, 166 are each rotatably supported by upper pillow blocks 172 (FIG. 3) mounted on beams 64 and lower pillow blocks 174 (FIG. 5) mounted on beams 142, 144. A reversible motor 176, such as a fluid motor, illustrated in broken lines in FIG. 5, is operatively connected to main shaft sprocket 160 to drive conveyor 48 in opposite directions.

Each separator 167 is formed with a pair of vertical sides 178 which are notched at their outer edges as indicated at numeral 180 (FIG. 3). The upper portion of sides 178 is flared upwardly and outwardly as at 181 (FIG. 2) to guide carrier 40 into the separators when a carrier drops downwardly from compartments 71, 72, 73 through outlets 134, 136, 138. Each separator 167 is dimensioned in height and depth slightly less than the height and depth of carrier 40, and in width slightly larger than carrier 40 to loosely retain a carrier in the separator. The open ends 190 of the tubes 20x, 20y, 20z and 20r are mounted on the lower portion 24 of housing 17 to be spaced vertically below separators 167. The outlet tubes are in line with outlets 134, 136, 138, respectively.

Gate 49 is disposed in the space between the bottom of separators 167 and the open ends 190 of loops LB, LC, LD, LR. Gate 49 extends horizontally between beams 142, 144 to partially close the lower open ends of separators 167 and overlie the open ends 190 of tubes 20x, 20y, 20z and 20r. Gate 49 is slidable on a pair of fixed rods 193, 194 to guide gate 49 for movement in a direction generally downwardly and rearwardly, to the left as viewed in FIG. 3. The ends of rods 193 are fixed in blocks 195 which in turn are mounted on one of the beams 144, 150. An air cylinder 198 mounted on beam 150 rearwardly of gate 49, has a piston 200 connected to a piston rod 202 which has its extended end secured to gate 49. Air cylinder 198 retracts gate 49 into and out of the space between buckets 167. Air cylinder 198 is actuated by an air valve 204 having a control member 206 operated by a link 208 which in turn is actuated by a solenoid coil 210.

Mounted on the inside of housing 17 forward of conveyor 48 (to the right as viewed in FIG. 3) are three limit switches 212, 214, 216 (FIG. 5). Each switch 212, 214, 216 has an operating arm 218 whose free end is disposed in line with a respective one of the outlets 134, 136, 138 and the corresponding open end 190 of tubes 20x, 20y and 20z. Switches 212, 214, 216 are positioned vertically such that arms 218 register with and project into notches 180 in separators 167. A limit switch 220 having an arm 218 is similarly mounted on housing 17 for the loop LR. Arms 218 and notches 180 are dimensioned such that arms 218 clear separators 167 and are not actuated when empty separators move laterally past the switches 212, 214, 216, 220. However, arms 218 are operated by a carrier when it is disposed in one of the separators 167 as shown in FIG. 5 by the arm 218 in dotted lines for the switch 220 to indicate that a carrier is positioned above an outlet loop. Mounted on housing 17 to the right of switch 212 and inwardly or to the left of the right end of gate 49 as viewed in FIG. 5, is a limit switch 222. Switch 222 is disposed in a manner similar to switches 212, 214, 216, 220 such that its operating arm will not be operated by the separators but will be operated by a carrier 40 when it is disposed in a separator. Switch 222 reverses the direction of the conveyor 48 to assure that a carrier is not transmitted laterally beyond gate 49. Also, adjacent the right end of gate 49 is a limit switch 228 mounted on the underside of beam 144 and having its operating arm 229 (FIGS. 3 and 5) disposed to engage the front edge of gate 49. When gate 49 is retracted by cylinder 198, arm 229 moves rearwardly, upwardly as viewed in FIG. 5, to the position illustrated in dotted lines.

OPERATION AND CONTROLS GENERALLY

Figure 7:
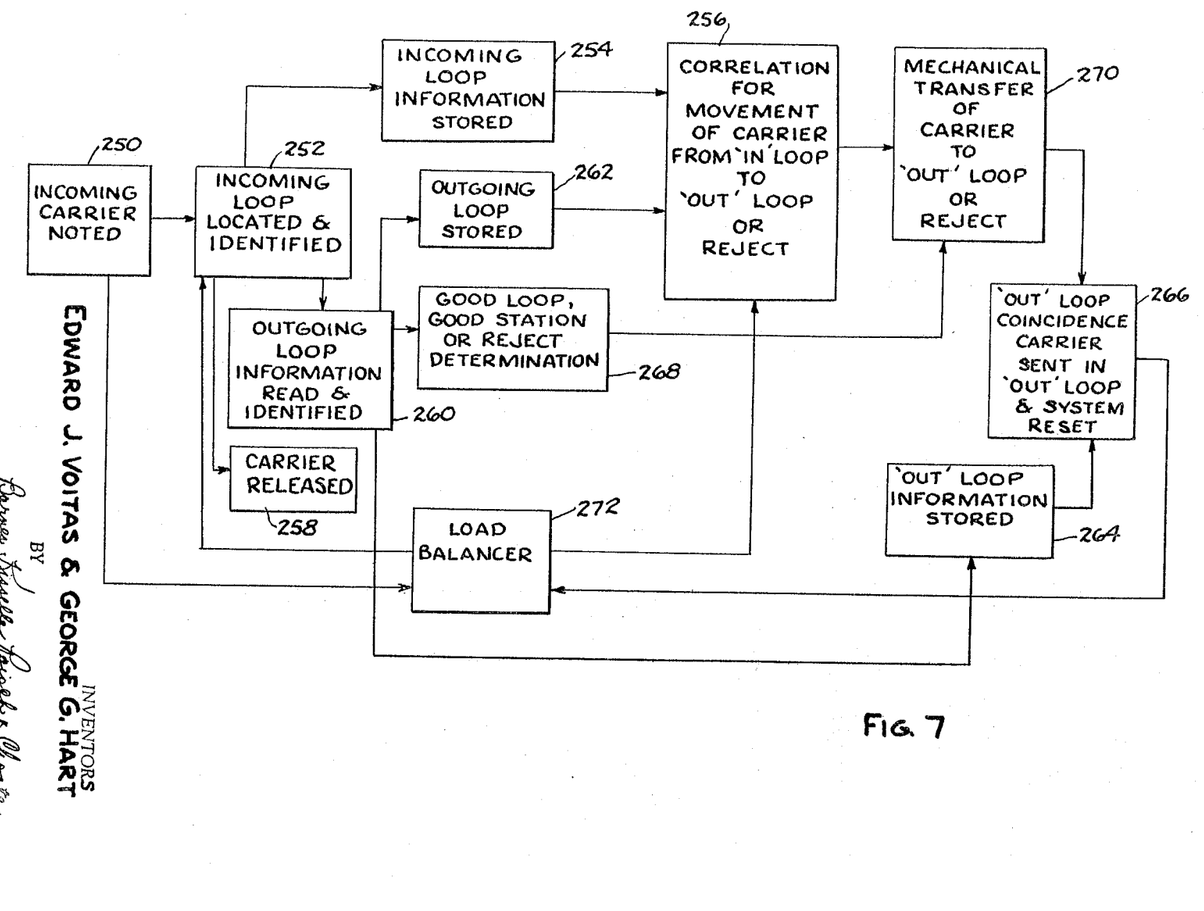
FIG. 7 is a block diagram of the relay controls for operating the exchanger shown in FIGS. 1–5 in accordance with the present invention.
Figure 8:
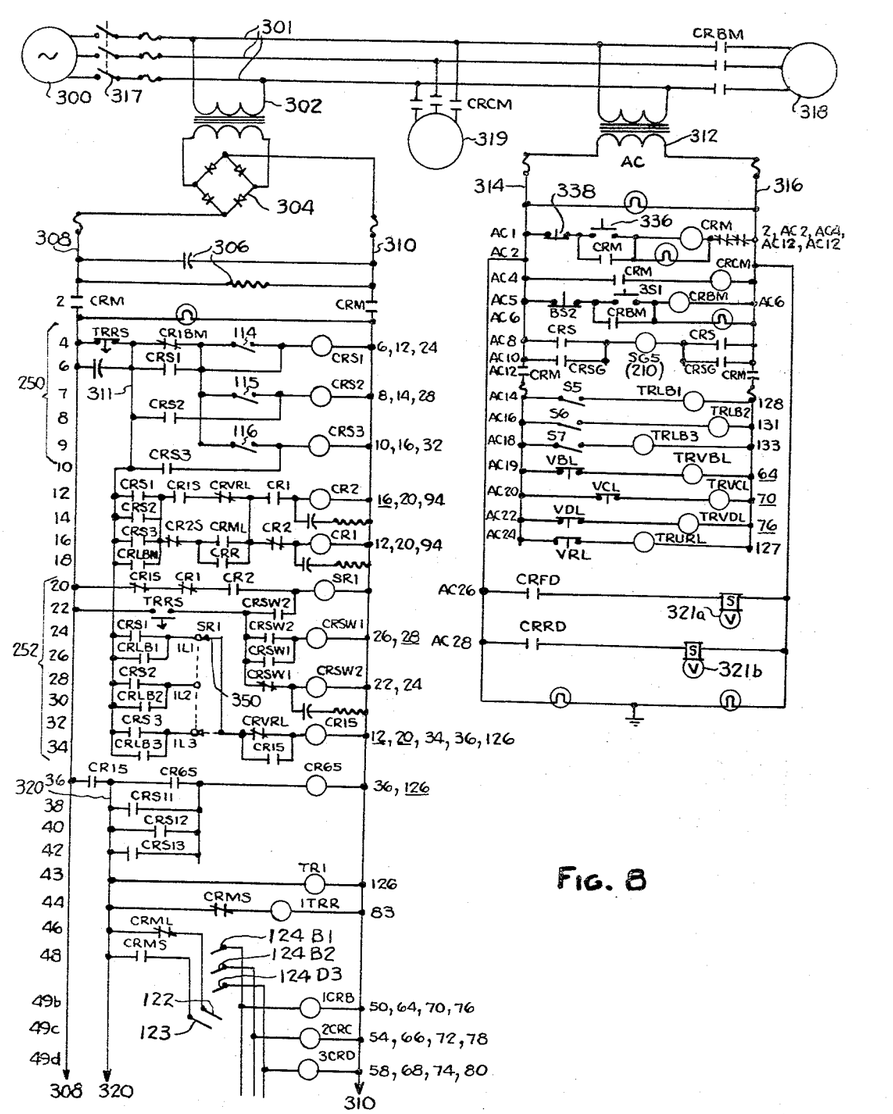
Figure 9:
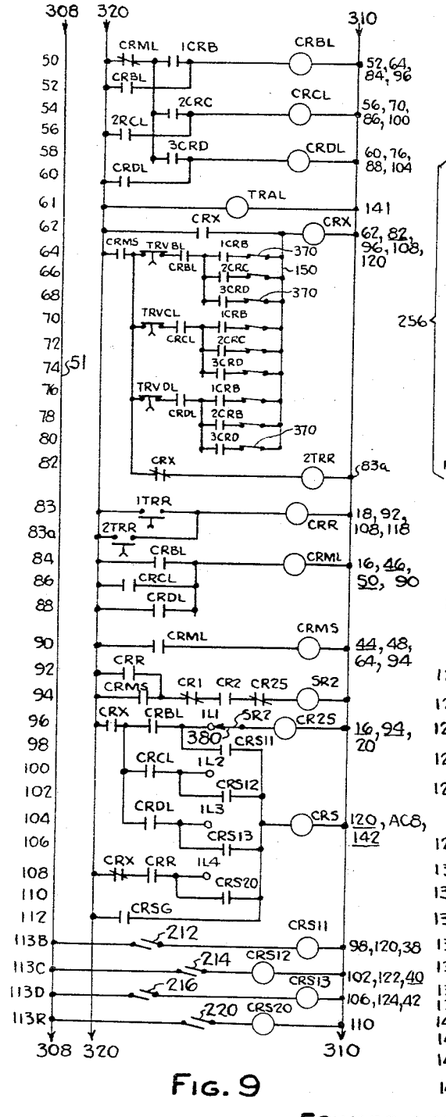

Operation of the exchanger described above, together with a description of a relay control circuit, is best understood in connection with the block diagram illustrated in FIG. 7. The relay circuits are shown in detail in FIGS. 8–10, whereas they are represented functionally in the block diagram shown in FIG. 7. In FIGS. 8–10, relays and contacts are arranged in horizontal lines and each line has been given a number designation to the left of the line. At the right of each line having a relay coil therein are numbers designating the lines in which the contacts of the relay are located. Relays have been given combination letter and numeral designations to simplify reference to relay contacts. Each relay and the contacts operated thereby are identified by letter and numeral designations. For example, relay CR1 (line 16) has contacts CR1 (lines 12, 20 and 94).

An underscored numeral designation at the right side of the line indicates that the contact in that line is normally closed and is opened when the coil is energized whereas the absence of underscoring indicates that the contact is normally open and is closed when the coil is energized. A T in the letter designation indicates that the relay and its contacts are timed either opened or closed in the direction of the arrow. For example, in FIG. 8, line 4, the contact TRRS is normally closed when its coil is de-energized. When its coil is energized, the relay opens rapidly and when its coil is subsequently de-energized, the contacts close after a predetermined time delay. In line 64 (FIG. 9), contact TRVBL is normally closed when its coil is de-energized. When its coil is energized, contact TRVBL will remain closed until after a predetermined time delay. In line 126, contact TR1 is normally open when its solenoid is de-energized but when the solenoid is energized, contact TR1 will close after a predetermined time delay.

Referring to FIG. 7, when a carrier arrives at one of the compartments 71, 72, 73 (FIG. 2), the incoming carrier is noted by switches 114–116 (FIG. 4) to actuate a circuit designated 250 (lines 4–9, FIG. 8) which in turn energizes a circuit designated 252 (lines 20–34, FIG. 8) to locate and identify the tube in which a carrier is awaiting processing. After the incoming tube is identified by the circuit 252, this information is stored as designated by block 254 (lines 120–124, FIG. 10) for use by a belt direction or correlation circuit 256 (lines 120–124, FIG. 10), which selects the proper direction for moving conveyor 48 to transfer the carrier from the incoming tube to the predesignated outgoing tube or reject tube. Simultaneously, after the incoming tube is identified by the circuit 252, the carrier is ejected from its compartment 71, 72, 73 (FIG. 2) by the appropriate one of the release arms 76 via solenoids 98 (FIG. 3) as designated by the block 258 (FIG. 7). Solenoids 98 are designated RA1, RA2, RA3, lines 126, 126a, 126b in FIG. 10. The outgoing tube information is read (lines 46–49d, FIG. 8) from the contact rings 50, 52, 54 by brushes 122, 123, 124 (FIG. 3) and identified (lines 50–60, FIG. 9) as designated by block 260. The identity of the outgoing tube is stored as designated by the block 262 (lines 120–124, FIG. 10) for use in the correlation circuit 256. The identity of the outgoing tube is also stored as designated by the block 264 (lines 50–61, FIG. 9) for use by an out tube coincidence circuit designated by block 266 (lines 96–110, FIG. 9). The outgoing tube identity from block 260 is also used to determine whether the predesignated loop or station for which the carrier is set is a good loop and a good station, that is, whether the carrier can go to its preselected destination as designated by the block 268 (lines 62–82, FIG. 9).

After completion of the above control operations, the carrier 40, being processed, will be resting in one of the separators 167. Mechanical transfer to the predesignated outgoing tube or to the reject tube is initiated by carrier tripping operation of one of switches 212, 214, 216 and conveyor 48 is moved in the proper direction toward the preselected outgoing tube or reject tube by a mechanical transfer circuit 270 (lines 113E–125, FIG. 10). When the carrier reaches the outgoing tube and trips the appropriate one of switches 212, 214, 216, 220 (FIG. 4) this coincidence is noted in the out tube coincidence circuit 266 which stops conveyor 48 and retracts slidegate 49 (FIGS. 2–5) to release the carrier from separator 167 into the outgoing or reject tube. Retraction of slidegate 49 releases switch 228 (FIG. 5) to reset the controls. The control circuit also includes a load balancer designated by the block 272. In general, each time the control circuit is reset, load balancer 272 scans the incoming tube. If incoming carriers have built up to a predetermined number in any one incoming tube, load balancer 272 then automatically eliminates further incoming tube identification and operates the correlation circuit 256 only for the incoming tube or tubes in which carriers are stacked up.

Referring to the relay circuit (FIGS. 8–10), a three-phase input 300 (FIG. 8) is connected through lines 301, a transformer 302, a bridge rectifier 304, and a parallel resistance-capacitor circuit 306 to provide a direct current across a pair of main lines 308, 310 which supply the circuit illustrated on the left of FIG. 8 and also the circuits shown in FIGS. 9 and 10. Also connected across the three-phase input 300 is a transformer 312 to supply a pair of alternating current lines 314, 316. A suitable contactor 317 is connected in lines 301 to disconnect the entire control from input 300. Input 300 is also adapted to be connected to a blower motor 318 by contacts CRBM and a compressor motor 319 by contacts CRCM. Motor 319 drives a compressor (not shown) to power the various air cylinders and a hydraulic pump for fluid motors in the system. Motor 318 is used to supply the necessary vacuum to tube L1–B, L2–C, L3–D via pipe 42. Motor 318 operates suitable pumps to establish vacuum in tubes 20 via the vacuum supply pipe 42.

The alternating current controls across lines 314, 316 generally comprise main on-off controls (lines AC1, AC2), a control for compressor motor 319 (line AC4) and a control for blower motor 318 (lines AC5 and AC6). Lines AC8, AC10 control slidegate 49 (FIGS. 2–5). Lines AC14–18 control a load balance operation via switches 55, 56, 57 (FIG. 1) when carriers are stacked up in one or more of the incoming tubes L1, L2, L3. Lines AC19–24 operate in response to an insufficient vacuum in tubes L1–B, L2–C, L3–D and LR to prevent carriers from entering a tube having insufficient vacuum. Lines AC26, 28 are main power controls for operating a pair of fluid valves 321a, 321b that control motor 176 (FIG. 5) to drive conveyor 48 in opposite directions.

In general, the control circuit connected across lines 308, 310 (FIGS. 8, 9 and 10) comprises carrier arrival noting circuit (250, FIG. 7; lines 4–10, FIG. 8; switches 114, 115, 116, FIGS. 4 and 8). Lines 12–18 are a pulsing circuit which actuates a pair of stepping relays SR1 (line 20) and SR2 (line 94). Stepping relay SR1 has three contact arms 350 (lines 24–31), 352 (lines 126–126b) and 354 (lines 120–124). Relay SR2 has four contact arms 380 (lines 96–108), 382 (line 120), 384 (line 122) and 386 (line 124). Lines 22–34 are the incoming tube identification circuit 252 (FIG. 7), including arm 350 of stepping relay SR1. Beginning at line 36 is a direct current line 320 connected to line 308 by contacts CR15.

Lines 36–42 are part of a protection circuit that prevents operation of release arms 76 after one carrier has dropped into separators 167 until the controls are reset. Line 43 includes a time delay relay TR1 that delays operation of the release arms 76 to assure that carriers 40 come to a complete stop on bumpers 117 (FIGS. 2 and 4) before being ejected from the compartments 71, 72, 73. Line 44 includes a time delay relay 1TRR which initiates reject operation if a good loop is not read from carriers 40 within prescribed time limits. Lines 46–49d includes brushes 122, 123 (FIG. 3), brushes 124, and relays 1CRB, 2CRC, 3CRD. Three of the brushes 124 (FIG. 3) are identified in FIG. 8 as 124B1, 124C2, 124D3 for reading three loop and station designations on carrier 40. Lines 50–60 identify the outgoing tube read by brushes 122, 123, 124.

Line 61 includes a time delay relay TRAL for indicating that a transfer operation has not been completed within a preset time. Lines 62–80 generally comprise the good loop-good station circuit 268 (FIG. 7), including three loop contacts CRBL, CRCL, CRDL and nine station contacts 1–3CRB–D. Lines 62–80 also include manually operated switches 370 that are located at stations 26, 28 so that a carrier will not be sent to the station unless it is attended. Also in lines 62–80 are three time delay relay contacts TRVBL–DL which prevent sending a carrier into a loop that does not have sufficient vacuum to propel the carrier. Line 82 includes a time delay relay ZTRR which indicates reject operation if a good station is not read from carrier 40 within prescribed time limits after a good loop reading is obtained. Lines 83–83a include timed contacts LTRR and 2TRR which initiate reject operation if a good station or good loop is not read within a preset time. Lines 84–88 indicate that a good loop reading has been obtained and initiate the station read-out via relay CRML, CRMS (line 90). Lines 92, 94 include the stepping relay coil SR2 which is pulsed from the pulser in lines 12–18 (FIG. 8). Lines 96–112 comprise the out loop coincidence circuit 266 (FIG. 7), including arm 380 of relay SR2. Lines 113 B, C, D, R include switches 212, 214, 216, 220 (FIG. 5) which indicate the position of a carrier 40 as it is transferred by conveyor 48. Lines 113E–117 include relays CRFD, CRRD which operate conveyor 48 to the left and right (forward, reverse) respectively, as viewed in FIGS. 2–5 via valves 320, 321 (lines AC26, 28) and motor 176 (FIG. 5). Lines 118–124 are the belt direction selection circuit 256 (FIG. 7), including the arm 354 of stepping relay SR1 and arms 382, 384, 386 of relay SR2.

Line 125 includes three switches 330, 332, 334 for manually operating or jogging exchanger 16, for example, to align separators 167 with outlets 134, 136, 138. Switch 330 is opened for automatic operation and closed for manual operation. Switch 334 is moved to the top contact position to move conveyor 48 to the left as viewed in FIGS. 2, 4 and 5 and to the bottom position to move conveyor 48 to the right. With switches 330 closed and switch 334 set in its top or bottom position, conveyor 48 will move in the corresponding direction when switch 332 is closed.

Lines 126–126b include the solenoids RA1–3 (solenoids 98, FIG. 3) and the third arm 352 of stepping relay SR1. Line 126c includes a solenoid CRSG which assures retraction of the slidegate 49 when the carrier is positioned above reject tube LR. Line 127 indicates absence of proper vacuum in the reject tube LR. Lines 128–140 are part of load balancer 272 (FIG. 7), including timed contacts TRLB1–3. Lines 142, 144 are part of the reset circuit 266 (FIG. 7) actuated by retraction of the slidegate 49.

OPERATION AND CONTROLS IN PARTICULAR

The relays and other circuit elements are shown in FIGS. 8, 9 and 10 as they appear at the completion of the last transfer operation after the entire control circuit has been reset. With contactor 317 closed, operation of the pneumatic tube system and exchanger is initiated by closing a start switch 336 (line AC1) to energize relay CRM through a normally closed stop switch 338. The control circuit is set for automatic operation by opening switch 330 (line 125, FIG. 10). Relay CRM closes five contacts. Contact CRM in line AC2 seals relay CRM. Contact CRM in line AC4 energizes relay CRCM to close contacts CRCM and start motor 319. The two CRM contacts at line AC12 complete the alternating current circuit for lines 314, 316. A starter switch BS1 in line AC5 is then closed to energize master blower relay CRBM through closed contacts of a blower motor stop switch BS2. Relay CRBM starts motor 318 and seals by closing contacts CRBM in line AC6. Although only one blower motor 318 is shown, it is understood that the number of motors used will depend on the number and length of the tubes in the pneumatic tube system. Should proper vacuum not exist in any tube, the switches VBL, VCL, VDL, VRL (lines AC19–24) open to energize relays TRVBL–RL which in turn indicate absence of proper vacuum via contacts TRVBL–RL in lines 64, 70, 76, 127 so that no carriers will be introduced into a tube not having proper vacuum.

Carrier arrival

For purposes of illustration, it is assumed that a carrier is arriving on incoming loop L3 and the outgoing destination is set on the contact rings 50, 52 to tube L1 (output tube 20z) station 3. The carrier 40 arrives at exchanger 16 through tube 20a of loop L3, enters through valve 44 momentarily energizing load balance switch 57 and then drops into compartment 73. Switch 57 (line AC18, FIG. 8) momentarily energizes relay TRLB3 which has timed contact TRLB3 (line 133). Contact TRLB3 will not time closed unless carriers are stacked up vertically to continuously actuate switch 57. When carrier 40 bottoms in compartment 73 against bumper 117, it closes limit switch 116 (FIG. 4; line 9, FIG. 8) to indicate the arrival of a carrier for processing. Switch 116 energizes relay CR53 (line 9) through closed master load balance contact CRLBM and closed reset contact TRRS. Relay CR53 has three normally open contacts. Contact CR53 in line 10 seals relay CR53. Contact CR53 in line 16 energizes the pulser relay CR1 (line 16) through closed contacts CR2 (line 16), CRVRL and CR15 (line 12). Contact CR53 in line 32 closes to indicate incoming loop L3 for arm 350 of relay SR1.

Incoming tube identification and storage

Referring to the operation of the pulser relays CR1, CR2 (lines 16, 12) in more detail, so long as one of the incoming tube contacts CR51–53 and contacts CR15, CRVRL are closed, relay CR1 will open its contact CR1 in line 20 and close contact CR1 in line 12. Relay CR1 also has a contact in line 94 for operating the second stepping relay SR2. When relay CR2 is energized, contact CR2 in line 16 is opened and two contacts CR2 (lines 20, 94) are closed. Thus relays CR1, CR2 are alternately switched on and off. Each of the relays CR1, CR2 is shunted by a respective resistance-capacitance holding circuit which maintains the relays energized for a short period after it is disconnected from line 311. Thus, after contact CR1 (line 12) opens, relay CR2 (line 12) remains energized for a short period overlapping the energization of relay CR1 (line 16) so that contacts CR1, CR2 (line 20) are closed simultaneously for a short period on each switching cycle of relays CR1, CR2 to pulse relay SR1 (line 20). On each pulsing of relay SR1, arm 350 (line 24) steps from one contact level 1L1, 1L2, 1L3 (lines 24, 28, 32) to the next adjacent level.

In the example for incoming tube 20a (loop L3), when arm 350 reaches level 1L3, relay CR15 (line 32) is energized through closed contacts CRVRL, CR53 (line 32). Relay CR15 has two normally closed contacts and three normally open contacts. Contact CR15 in line 12 opens to stop operation of the pulser CR1, CR2. Contact CR15 in line 20 opens to assure that relay SR1 is not actuated further and will not be reactivated when the pulser, including relays CR1 and CR2 is reactivated to energize second stepping relay SR2. Contact CR15 in line 34 closes to seal relay CR15. Contact CR15 in line 36 closes to supply power to direct current line 320. Contact CR15 in line 126 readies the three release arm solenoids RA1–3 (lines 126, 126a, 126b, FIG. 10; 98, FIG. 3). When relay SR1 stops, arm 352 (line 126) of relay SR1 will also be positioned at the third level 2L3 (line 126b). Arm 354 of relay SR1 in the belt direction selection circuit will also stop at level 3L3 (line 124). When contact CR15 in line 36 closes, relay TR1 (line 43) is energized to close contacts TR1 (line 126) and thereby energize solenoid RA3 to actuate the release arm 76 in compartment 73. Contact TR1 (line 126) is timed closed to assure that carrier 40 has come to rest in compartment 73 before release arm 76 is actuated. Closure of contact CR15 in line 36 also energizes a timed relay 1TRR (line 44) through closed contact CRMS. Unless a good loop is read within a preset time, contact 1TRR (line 83) closes to initiate reject operation. Also, when contact CR15 in line 36 closes, a timed relay TRAL (line 61) is energized. Unless the complete transfer operation is completed within a preset time, contact TRAL (line 141) will close to light a warning bulb 356 (line 141).

*Read-out and good loop determination*

Operation of release arm 76 ejects carrier 40 from compartment 73 and carrier 40 drops through outlet 138 into one of the separators 167. During ejection of carrier 40, loop and station designations on the carrier are read by brushes 122, 123, 124 (FIGS. 3 and 8). The designation for outgoing tube 20z (loop L1) is read by brushes 122, 124 to energize relay 1CRB (line 49b). Relay 1CRB has four normally open contacts. Contact 1CRB in line 50 energizes relay CRBL through closed contacts CRML to identify the tube 20z (loop L1) as the preset outgoing tube. The same brush 124B1 is used for both tube 20z and station number 1. Therefore, although contacts 1CRB in lines 64, 70, 76 are closed momentarily, they will have no effect until a good station determination is made. When the relay CRBL (line 50) is energized by brush read-out, four normally open contacts close. The CRBL contact in line 52 seals relay CRBL. Contact CRBL in line 64 sets tube 20z as the outgoing tube and readies circuit 268 for good station determination. Contact CRBL in line 84 energizes relay CRML to indicate that outgoing tube and loop read-out has been completed. Contact CRBL in line 96 identifies tube 20z to ready the outgoing coincidence circuit 266. When relay CRML (line 84) is energized, two normally open contacts are closed and two normally closed contacts are opened. Contact CRML in line 16 reactivates the pulser relays CR2, CR1 to operate the second stepping relay SR2. Contact CRML in line 46 opens the outgoing tube read-out brush 122. Contact CRML in line 50 opens to prevent energization of relays CRCL and CRDL (lines 54, 58) during station read-out. Contact CRML in line 90 energizes a master station relay CRMS which has one normally closed contact and three normally open contacts. Contact CRMS in line 44 opens to disconnect relay 1TRR. As stated previously, unless outgoing tube and loop read-out occurs within a preset time, relay 1TRR will time out and initiate reject operation. Contact CRMS in line 48 connects brush 123 to line 320 for station read-out. The CRMS contact in line 64 closes to ready the good loop-good station determination. Additionally, when contact CRMS in line 64 closes, timed relay 2TRR (line 82) is energized to initiate reject operation if a good station is not read in a preset time. Contact CRMS in line 94 closes to energize stepping relay SR2 upon coincident closure of contacts CR1, CR2 (line 94) by relays CR1, CR2 (lines 12, 16).

Referring to station read-out for the example, selector 52 was set for station number 3 which read by brushes 123, 124D3 to energize relay 3CRD (line 49d) through closed contact CRMS, and brushes 123, 124D3. Relay 3CRD has four contacts normally open. Contact 3CRD in line 58 has no effect when it closes because contact CRML (line 50) opened after loop LB was set as the outgoing tube. Contacts 3CRD in lines 68, 74, 80 ready good station determination. In the example, when contact 3CRD in line 68 closes, relay CRX (line 62) is energized through closed contacts CRMS, TRVBL, CRBL, 3CRD, and switch 370 (line 68). Switch 370 is operated at stations 26, 28 (FIG. 1) to indicate that someone is in attendance at the station. As indicated previously, should the vacuum in loop L1 be inadequate, contact TRVBL (line 64) will open and a good loop read-out cannot be obtained. Relay CRX has three normally open contacts and two normally closed contacts. Contact CRX in line 62 seals relay CRX. Contact CRX in line 96 readies the out tube coincidence circuit 266 (FIG. 7). Contact CRX in line 120 readies the belt direction or correlation circuit 256. Contact CRX in line 82 opens to disconnect timed relay 2TRR. As previously mentioned, relay 2TRR began to time out when station read-out was initiated. Unless a good loop-good station determination is obtained as indicated by the energization of relay CRX, contact 2TRR (line 83a) will time out to energize relay CRR (line 83) and initiate reject operation. Contacts CRX in line 108 open to prevent identification of the reject tube as the selected outgoing tube.

*Out tube storage*

As previously mentioned, when the contact CRMS in line 94 closed, relay SR2 (line 94) was pulsed via relays CR1, CR2 (lines 12 and 16). Arms 380 (line 96), 382 (line 120), 384 (line 122), 386 (line 124) of relay SR2 each have four contact levels 1L1–4 (arm 380), 2L1–4 (arm 382), 3L1–4 (arm 384) and 4L1–4 (arm 386). Arms 380, 382, 384, 386 will be stepped simultaneously through the levels until arm 380 reaches the contact for the selected outgoing tube. In the example, the selected outgoing tube is 20z (loop L1). When arm 380 reaches contact 1L1, corresponding to tube 20z and loop L1, relay CR25 (line 96) will be energized through the now closed contacts CRX, CRBL, and arm 380. Relay CR25 has two normally closed contacts and one normally open contact. Contact CR25 in line 16 opens to deactivate pulse relays CR1, CR2. Contact CR25 in line 94 opens to deactivate the stepping relay SR2. Contact CR25 in line 120 closes to ready the belt direction or correlation circuit 256 (FIG. 7). When relay SR2 stops, arms 382, 384, 386 of stepping relay SR2 will also be positioned at the level corresponding to outgoing loop LB for selecting the direction in which conveyor 48 is to be moved.

*Belt direction selection*

Referring in detail to correlation circuit 256 (FIG. 7), lines 113E–125 (FIG. 10) each of the incoming loops L1, L2, L3 corresponds to a respective contact 3L1, 3L2, 3L3 (lines 120, 122, 124) which are sequentially engaged by arm 354 of stepping relay SR1. Each of the incoming loop contacts 3L1, 3L2, 3L3 is adapted to be connected through one of the contacts CRS511, CRS512, CRS513 with a respective one of the arms 382, 384, 386 of the second stepping relay SR2. Each of the arms 382, 384, 386 has a set of four contacts corresponding to the three outgoing tubes 20x, 20y, 20z and the reject tube 20r. For example, arm 382 (line 120) has a contact 2L1 corresponding to loop LB, a contact 2L2 corresponding to loop LC, a contact 2L3 corresponding to loop LD and a contact 2L4 corresponding to reject loop LR. Contacts for each of the arms 382, 384, 386 are arranged in parallel groups. One group is connected to relay CRFD (line 114) via a lead 390 and switch 220 to move conveyor 48 to the left as viewed in FIG. 5. Another group is connected to relay CRRD (line 116) via a lead 392 and switch 222 to move conveyor 48 to the right as viewed in FIG. 5. The remaining contact is not connected to either relay CRFD, CRRD so that conveyor 48 will not be moved. For example, referring to contacts 2L1, 2L2, 2L3, 2L4 for the arm 382 of stepping relay SR2, contact 2L1 is not connected to either of the relays CRFD, CRRD. Thus, if the predesignated outgoing tube is 20z (loop 1), which is disposed vertically below the incoming tube 20a (also in loop 1), conveyor 48 will not be actuated in either direction. Contacts 2L2, 2L3, 2L4 are connected through lead 390 to relay CRFD. Thus, if a carrier arriving at tube 20a is

Figure 2:
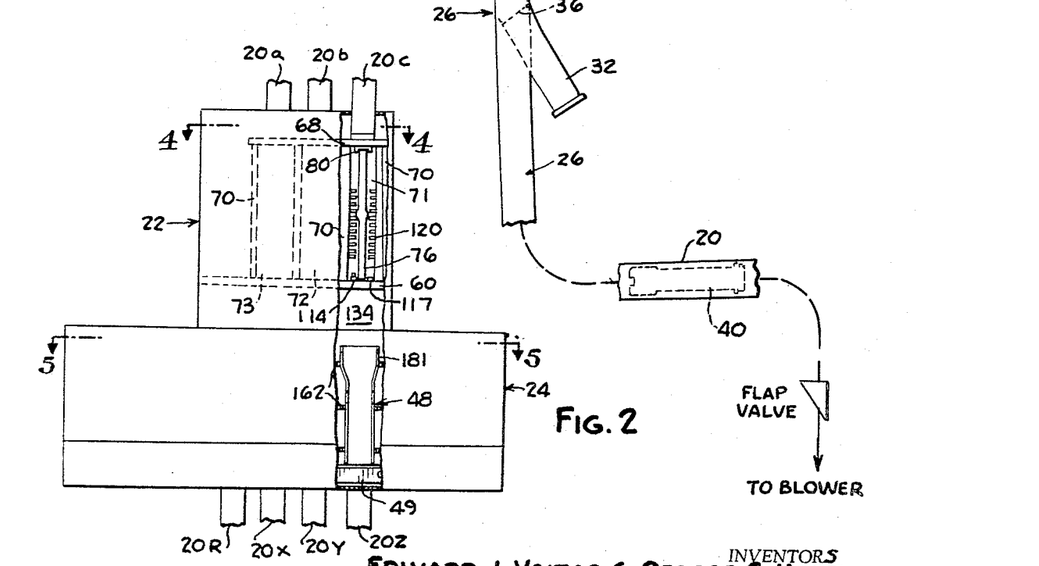
FIG. 2 is a front view of the exchanger taken in the direction of the arrow 2 in FIG. 1 with a portion of the exchanger housing broken away.

11 predesignated for tube 20x, 20y or 20r, arm 382 will engage a respective one of the contacts 2L2, 2L3, 2L4 to energize relay CRFD and thereby drive the conveyor 48 toward the left as viewed in FIGS. 2, 4 and 5.

By way of further example, referring to line 124 for the incoming loop L3, contacts 4L1, 4L2 which correspond to loops LB, LC are both connected to relay CRRD to drive conveyor 48 toward the right as viewed in FIG. 5. Contact 4L3, which corresponds to tube 20x, is not connected to either of the relays CRFD, CRRD because tube 20x is disposed in line with tube 20a. Contact 4L4, which corresponds to reject loop LR, is connected to the solenoid CRFD to drive conveyor 48 toward the left as viewed in FIG. 5 when carrier 40 is to be transferred to the reject loop LR. In the example, where the carrier is being transferred from incoming tube 20a to outgoing tube 20x, arm 354 of SR1 will be at line 124 and arm 386 of SR2 will be at the 4L1 contact (line 124).

*Mechanical transfer*

Brush read-out, good loop-good station determination, readying of the outgoing tube coincidence circuit, and readying of the belt direction selection circuit have occurred substantially simultaneously as carrier 40 is ejected from compartment 73 by release arm 76. When carrier 40 drops into the separator 167, limit switch 216 (FIG. 5; line 113D, FIG. 9) is actuated energizing relay CRS513 (line 113D). Relay CRS513 has three normally open contacts. Contact CRS513 in line 106 closes to indicate the position of the carrier for outgoing loop coincidence. Contact CRS513 in line 124 closes to complete a circuit to energize one of the relays CRFD, CRRD. Contact CRS513 in line 42 closes to energize relay CRS65 (line 36) to assure that no other carriers are ejected from compartments 71, 72, 73. In the example, contact CRS513 (line 124) completes a circuit through contacts CR25 (line 120), CRS, CRX, arm 354 (line 124), CRS513, arm 386, contact 4L1, lead 392 and switch 222 to relay coil CRRD (line 116). Relay CRRD has two normally open contacts. Contact CRRD in line 116 seals relay CRRD. Contact CRRD in line AC28 closes to energize valve 321 and rotate motor 176 (FIG. 1) to move conveyor 48 to the right as viewed in FIG. 5 and carrier 40 from loop L3 toward loop LB.

By way of further example, had the incoming loop been designated loop L1 and the outgoing loop LD, arm 354 of relay SR1 would be at level 3L1 (line 120) and the arm 382 of SR2 would be at level 2L3 so that relay CRFD would be energized to move conveyor 48 to the left as viewed in FIG. 5.

To summarize, five conditions must be met before conveyor 48 moves:

(1) Stepping relay SR2 must be on the contact for the designated outgoing tube so that contact CR25 (line 129) is closed.

(2) The outgoing tube must be a tube other than that directly beneath the incoming tube so that arms 382, 384, 386 of relay SR2 will be on a contact that is connected to either relay CRFD or CRRD.

(3) The carrier must either have received a good loop-good station read-out so that the CRX contact (line 120) is closed or the carrier must be designated as a reject carrier so that the CRRD contact (line 118) is closed.

(4) Stepping relay SR1 must be located on the correct incoming tube position so that arm 354 of stepping relay SR1 (line 124) is in series with the correct contact (CRS513, line 124) for the separator 167 corresponding to the incoming tube.

(5) The carrier must be in a separator 167 under the correct incoming tube to close contact CRS513 (line 124).

12

*Out loop coincidence and carrier release*

Referring to the outloop coincidence circuit (266, FIG. 7; lines 96–110, FIG. 9), arm 380 of stepping relay SR2 was moved sequentially into and out of engagement with contacts 1L1, 1L2, 1L3, 1L4, 1L1, etc., during loop readout. Contacts 1L1, 1L2, 1L3 correspond to outgoing tubes 20z, 20y and 20x in loops L1, L2 and L3 whereas contact 1L4 corresponds to the reject tube 20r. Arm 380 is connected to the supply line 310 through the coil of relay CR25. Each of the contacts 1L1, 1L2, 1L3 are connected to the other supply line 320 through one master contact CRX and a respective outgoing loop contact CRBL, CRCL, CRDL. If a good loop and a good station determination has been made and the control circuit is ready to transfer the carrier to a preset outgoing tube, contact CRX (line 96) and one of the contacts CRBL, CRCL, CRDL are closed. However, if the control system is to transfer a carrier to the reject tube 20r, contact 1L4 is connected to supply line 320 through a normally open contact CRR and a normally closed contact CRX (line 108). As arm 380 steps sequentially through contacts L1, L2, L3, L4, L1, etc., relay CR25 (line 96) will be energized when arm 380 engages a contact corresponding to the carrier designation as indicated by a closed one of the contacts CRBL, CRCL, CRDL, CRR. Energization of relay CR25 terminates movement of SR2 with arm 380 in a position corresponding to the destination of the outgoing carrier.

Contact CRX and each one of the contacts CRBL, CRCL, CRDL are connected across lines 320, 310 in series with a respective normally open contact CRS511, CRS512, CRS513 and relay CRS (line 104). Contacts CRX, CRR (line 108) are also connected in series with relay CRS across lines 320, 310 by a normally open contact CRS520. As a carrier 40 is transferred laterally by conveyor 48, the carrier will sequentially close and open contacts CRS511, CRS512, CRS513, CRS520 via limit switches 212, 214, 216, 220 (FIG. 5; lines 113 B, C, D and R, FIG. 9) until the contact corresponding to the proper destination closes to energize relay CRS. Relay CRS has three contacts which simultaneously terminate movement of the conveyor 48 (contact CRS, line 120), ready the reset circuit (contact CRS, line 142) and actuate air cylinder 198 (FIG. 3) via contacts CRS in line AC8 to retract slidegate 49 and thereby release carrier 40 from conveyor 48 into its predesignated outgoing tube or into reject.

For the example, carrier 40 is transferred from incoming tube 20a toward outgoing tube 20z, to the right as viewed in FIG. 5. Limit switch 214 is first closed energizing relay CRS512 and closing contact CRS512 (line 102) which has no effect because contact CRCL is open. However, when the carrier actuates limit switch 212 (FIG. 5; line 113B, FIG. 9) above the selected outgoing loop LB, relay CRS511 (line 113B) is energized. Relay CRS511 has three normally open contacts. Contact CRS511 in line 98 closes to energize relay CRS (line 104) through contacts CRX, CRBL (line 96) to indicate that the selected outgoing loop has been reached. Contacts CRS511 in lines 120 and 38 have no effect since they are used for other purposes stated previously. With carrier 40 over the selected outgoing loop LB and relay CRS (line 104) energized two normally closed contacts in line 120, 142 open and two normally open contacts AC8, AC8 close. Contact CRS in line 120 disconnects relay CRRD (line 116) to stop conveyor 48. Contacts CRS in line AC8 operate the slidegate solenoid SGS to retract slidegate 49 permitting carrier 40 to drop downward from the conveyor into loop LB. Contact CRS in line 142 opens to ready reset operation.

*Reset and load balance*

Slidegate limit switch 228 (FIG. 5; line 142, FIG. 9) is normally held open when slidegate 49 is in its normal position disposed above the outgoing tubes. However, when the slidegate retracts to release the carrier into its selected outgoing tube, limit switch 228 (FIG. 5 at right) closes to ready reset operation via relays CRRS (line 144) and TRRS (line 142). As soon as the carrier drops out of separator 167, limit switch 212 (line 113B) opens de-energizing relay CRS511 (line 113B) which in turn opens contacts CRS511 (line 98) and disconnects relay CRS (line 104) so that contact CRS (line 142) closes and contacts CRS (line AC8) open. When contacts CRS (line AC8) open, slidegate 49 returns to its normal position. When contact CRS in line 142 closes, reset relay CRRS is energized (line 144). Relay CRRS has one normally open contact and one normally closed contact. Contact CRRS in line 128 opens to reset sealed-in load balance relays CRLB1, CRLB2 and CRLB3. Contact CRRS in line 142 closes to energize relay TRRS and reset the entire control circuit after a present time delay. Relay TRRS opens contact TRRS in line 4 to accomplish reset, and closes contacts in line 22 momentarily to pulse the stepping relay SR1 one time via relays CRSW1 and CRSW2 (lines 24 and 28) and thus assure that under normal operation the next carrier processed will come from a loop other than the loop that was just processed. In the example, when relay SR1 is pulsed, arm 350 is moved from contact L3 to L1 (line 24) so that if a carrier is in the incoming tube 20c, it will be processed next assuming there is no carrier build up in loop L3 to initiate load balance operation. Slidegate 49 returns to its normal position opening limit switch 228 (FIG. 5; line 142, FIG. 9) and thus de-energizing relay TRRS (line 142) whose contact in line 4 times closed to complete the reset operation.

Assuming that incoming carriers 40 are stacked up in loop L3, load balance limit switch 57 (FIG. 5; line AC18, FIG. 8) remains closed energizing relay TRLB3 so that contact TRLB3 in line 133 times closed energizing the incoming loop load balance relay CRLB3 (line 133) through the closed contacts CRRS (line 128). Relay CRLB3 has three normally open contacts. Contact CRLB3 in line 34 designates loop L3 as the incoming loop for load balance operation in the stepping relay SR1. Contact CRLB3 in line 134 seals relay CRLB3. Contact CRLB3 in line 140 energizes the master load balance relay CRLBM (line 136). Relay CRLBM has one normally open contact and one normally closed contact. Contact CRLBM in line 4 opens so that limit switches 114, 115, 116 (FIG. 5; lines 4, 7 and 9, FIG. 8) are ineffective to indicate the presence of a carrier in the incoming loop. Contact CRLBM in line 18 operates the pulser relays CR1, CR2. Carriers will continue to be processed from incoming loop L3 until the load balance condition is eliminated, that is, until the load balance limit switch 57 (FIG. 5; line AC18, FIG. 8) opens and relay CRLBL is reset by the last operation of contact CRRS (line 128). The system will then return to normal operation automatically processing carriers in sequence out of each incoming tube where a carrier is present. Any carrier being processed at the time a load balance condition occurs, will be transferred to its outgoing tube before the load balance operation is initiated.

*Reject operation*

Returning to reject operation, if either a good loop or a good station read-out is not obtained before timed relays 1TRR (line 44) or 2TRR (line 82) close their respective contacts in lines 83, 83a, relay CRR (line 83) is energized to initiate reject operation. Relay CRR has four normally open contacts. Contact CRR in line 18 bypasses the contact CRML (line 16) to operate pulser relays CR1, CR2 which in turn operate the stepping relay SR2 in the manner previously set forth. Contact CRR in line 92 bypasses the CRMS contact (line 94) to complete the circuit for stepping relay SR2. Contact CRR in line 108 identifies reject loop LR as the outgoing loop in the out loop coincidence circuit. Contact CRR in line 118 bypasses the good loop-good station relay contact CRX in line 120 to transfer the carrier directly to the reject loop as soon as arm 380 has stopped at contact level 1L4 (line 108) and the carrier has dropped into a separator to close one of the contacts CRS511, CRS512, CRS513 (lines 120, 122, 124). Operation of the belt direction selection circuit and the out loop coincidence circuit are substantially as described hereinabove for the loop L1 example.

In the example, assuming that the carrier did not get a good loop or good station read-out, contact CRR (line 108) would close and arm 380 of stepping relay SR2 would stop at level 1L4 (line 108) to position the arms 382, 384, 386 at the fourth level. As soon as carrier 40 drops into the separator 167 to actuate limit switch 216, relay CRS513 (line 113D) and its associated contacts, the carrier would be transferred directly to the left as viewed in FIG. 5 to the reject position. At the reject position, carrier 40 actuates limit switch 220 (line 113R) to operate slidegate 49 and complete the processing of the carrier in the manner set forth hereinabove for loop L1. Switch 223 is operated as a safety switch should switch 220 fail to provide the same function, i.e., stop the transfer motion and operate slidegate 49.

Transfer of a carrier to reject tube 20r will also occur if a carrier misses its preset outgoing tube. Referring again to the example where tube 20z is designated as the outgoing tube, should the carrier move past tube 20z in a direction to the right as viewed in FIG. 5, carrier 40 will actuate limit switch 222 closing switch 222 (line 113E) and opening switch 222 (line 116) to terminate movement of the conveyor 48. For example, a carrier 40 would miss its predesignated outgoing tube if the corresponding switch arm 218 was broken. Switch 222 in line 113E will energize motor control relay TRORF whose contact in line 117 times closed to energize relay CRFD (line 114) and move the conveyor 48 in the opposite direction toward reject. If the carrier again passes by its selected outgoing tube 20z, it will be transferred all the way to the reject tube 20r and will actuate limit switch 223 (lines 114, 126c). Limit switch 223 opens contacts in lines 114 and 126c. The contacts shown for switch 223 in line 114 and 126c may be operated directly by switch 223 (FIG. 5) or indirectly through other relays (not shown) to assure that conveyor 48 stops and slidegate 49 retracts when a carrier is disposed above the reject tube 20r. Any carrier that is not released into one of the outgoing tubes 20x, 20y, 20z will be transferred to reject and processed into the reject loop.

The central exchanger and controls therefor have been described hereinabove for a three loop system. However, it is to be understood that one aspect of this invention is an exchanger and controls therefor capable of handling a pneumatic tube system having numerous loops. The exchanger and controls therefor are easily modified for systems involving a substantially greater number of loops by merely adding corresponding parts in the exchanger and relays and contacts in the controls of the three loop system as disclosed hereinabove. Loops are connected only through the exchanger and have no common portions so that each loop can be operated independently of other loops. The use of a conveyor to transfer carriers laterally and directly from one tube to another provides a compact exchanger which operates effectively regardless of the number of tubes or loops. Since only one carrier is transferred at a time into any one outgoing tube, jamming of carriers in the exchanger or in the outgoing tubes is minimized. In pneumatic tube systems having a large number of outgoing tubes, ten, for example, transfer time is minimized by selecting the direction in which the conveyor moves to transfer the carrier directly from the incoming loop to the outgoing loop. Release of a carrier being transferred by the conveyor at its predesignated outgoing tube is accomplished by a simple and effective coincident relay circuit. Efficient operation of the exchanger is further enhanced by transferring a carrier directly to a reject tube if it cannot be transferred to its predesignated outgoing tube and station. Carriers entering the reject tube can be transferred to any convenient place for processing, correcting erroneous loop or station designations on the carrier or tracing a mechanical failure, for example, improper vacuum in the predesignated outgoing tube.

We claim:

1. In a pneumatic tube system wherein a carrier is conducted from one of a plurality of incoming loops to one of a plurality of outgoing loops by a central exchanger in accordance with preselected outgoing loop designations on said carrier, said incoming loops having ends that are open in a direction facing generally vertically downwardly into said exchanger, said exchanger comprising means forming a plurality of compartments in said exchanger for receiving a carrier from each of said open ends, each of said compartments being disposed below a respective open end of said loops, means operable in response to the arrival of a carrier in said receiving means for identifying said one incoming loop at which said carrier arrived, means for identifying said one outgoing loop preselected on said carrier, means for transferring said carrier from said receiving means to said one preselected outgoing loop comprising means for moving said carrier sequentially through positions corresponding to said outgoing loops, said transferring means being disposed vertically below said compartments and adapted to transfer carriers from said compartments in a generally horizontal direction laterally between said compartments, said outgoing loops having ends that are open in a direction facing generally vertically upwardly into said exchanger, said open ends of said outgoing loops being disposed vertically below said transferring means, means responsive to said incoming loop identification means for initiating transfer of said carrier from one incoming loop to a position corresponding to said one outgoing loop, and means responsive to said outgoing loop identification means for terminating transfer of said carrier when said carrier is in a position corresponding to said one preselected outgoing loop.

2. The combination set forth in claim 1 wherein each compartment has an inlet at the top thereof disposed below and in line with a respective incoming loop end to receive a carrier therefrom, an outlet in the bottom of each of said compartments, said compartment outlet being offset in a generally horizontal direction from said compartment inlet, and a plurality of release arms each of which is movable in a respective one of said compartments in a generally horizontal direction from said compartment inlet toward said compartment outlet, said compartment outlets being disposed above said conveying means for transferring said carrier from said compartments to said conveying means.

3. The combination set forth in claim 1 wherein said transferring means comprises an endless belt conveyor, means rotatably mounting said belt to revolve in a generally horizontal orbit, a plurality of receptacles having inlet openings adapted to receive a carrier, said receptacles being mounted on said belt in spaced relation so that the ing means for transferring said carrier from said compartments.

4. The combination set forth in claim 3 wherein receptacles are mounted on said belt throughout substantially the entire periphery thereof.

5. The combination set forth in claim 3 wherein each of said receptacles is open at its lower end to form an outlet spaced vertically above said loop inlets and means for releasing said carrier from said transfer means comprising gate means movable in the space between said receptacle outlet and said outgoing loops to overlie said loop inlets when said gate is in a closed position, said gate means being movable from said closed position to an open position whereby when a carrier is disposed in one of said receptacles and said one receptacle is disposed above one of said incoming loops, said gate may be opened to release said carrier from said one receptacle into said one outgoing loop.

6. The combination set forth in claim 5 further comprising means for noting the presence of a carrier disposed in said one receptacle, said means for terminating transfer of said conveyor being responsive to said carrier presence noting means and operable to open said gate means when said one receptacle has a carrier therein and is disposed above said one preselected outgoing loop.

7. The combination set forth in claim 6 wherein said carrier presence noting means comprises a stationary switch for each of said outgoing loops, each of said switches having an actuating means adapted to communicate with the interior of said receptacle through an opening therein, said actuating means being dimensioned relative to said receptacle, said opening, and said carrier so that when said carrier is disposed in a receptacle and moved past positions corresponding to said outgoing loops, said carrier in said receptacle engages said actuating means to actuate said switch, but empty receptacles do not engage said arms and operate said switches.

8. The combination set forth in claim 3 further comprising means for driving said conveyor in opposite orbital directions, said outgoing loops being disposed under a predetermined sector of said orbit of said conveyor, switch means responsive to a carrier disposed in one of said receptacles and operatively connected to said driving means to reverse the direction of said driving means, said switch means being disposed along said orbit adjacent an end of said sector whereby when a carrier is transferred along said sector by said conveyor, said carrier actuates said switch means when said carrier reaches said end of said sector to reverse the direction of said conveyor and move said carrier back across said outgoing loop inlets.

9. The combination set forth in claim 3 further comprising means for driving said conveyor in opposite orbital directions laterally of said outgoing loops, and means responsive to said incoming loop identification means and said outgoing loop identification means for selectively moving said transfer means in one of said opposite directions.

10. A central exchanger for use in a pneumatic conveyor system having a plurality of conduits for conveying carriers, said exchanger comprising a body, a plurality of inlets on said body adapted to be connected to said conduits, said inlets opening into an upper portion of said body, receiving means in the upper portion of said body adapted and arranged to receive carriers from said inlets, a plurality of outlets on said body adapted to be connected to said conduits, said outlets opening into a lower portion of said body and being spaced below said receiving means, an endless belt conveyor mounted on said body to revolve in an orbit which passes through the space between said outlets and said receiving means, said outlets being arranged rectilinearly along a sector of said orbit, receptacle means on said conveyor adapted and arranged to receive carriers from said receiving means and deliver the carriers to said outlets, means for dispatching carriers from said receiving means into said receptacles, means for driving said conveyor in opposite orbital directions to move said receptacles through said sector laterally and sequentially past said outlets, means for releasably retaining carriers in said receptacles while said receptacles are moved through said sector past said outlets, said carriers having means to designate one preselected outlet so that carriers can be transferred from said inlets to a preselected one of said outlets in accordance with outlet designations on said carrier, and control means for operating said exchanger in response to the arrival of carriers in said receiving means to dispatch one of said carriers from said receiving means into one of said receptacles, revolve said conveyor in an orbital direction to transfer said one carrier to said one preselected outlet, terminate movement of said conveyor when said carrier is disposed above said one preselected outlet and release said carrier from said conveyor into said one preselected outlet, said control means comprising circuit means for noting the arrival of said one carrier in said receiving means from one of said inlets to initiate operation of said control means, circuit means for locating and identifying said one inlet, circuit means responsive to said inlet identifying circuit means for operatng said dispatching means to transfer said one carrier from said receiving means into one of said receptacles, circuit means for identifying said one preselected outlet designated on said carrier, circuit means responsive to said inlet identifying circuit means and said outlet identifying circuit means for selecting one of said opposite orbital directions to move said conveyor and said one receptacle through said sector toward said one preselected outlet, circuit means responsive to said outlet identifying circuit means and to said one carrier while said one carrier is transferred by said conveyor for terminating transfer of said carrier when said one carrier is disposed above said one preselected outlet, and circuit means responsive to said transfer termination circuit means for releasing said one carrier from said one receptacle into said one preselected outlet.

11. The device set forth in claim 10 wherein one of said outlets is a reject outlet, circuit means responsive to said outlet identifying circuit means for determining whether said one preselected outlet is a good outlet to which a carrier can be transferred, said conveyor direction selecting circuit means being responsive to said good outlet determining circuit means and said inlet identifying circuit means to move said conveyor and said one receptacle through said sector toward said reject outlet, said transfer terminating circuit means and said carrier releasing means being responsive to said good outlet determining circuit means and said one carrier when said one carrier is disposed above said reject loop to terminate transfer of said one carrier and release said one carrier from said one receptacle into said reject outlet.

12. The device set forth in claim 10 wherein said outlet identifying circuit means comprises means for reading said preselected outlet designation from said carrier, said transfer termination means comprising a plurality of relay contacts serially connected in pairs each of which corresponds to one of said outlets, each of said pairs of contacts being connected in parallel with the other pairs of contacts, one of said contacts in each of said pairs being operatively connected to said outlet reading means to close said one contact corresponding to said one preselected outlet, the other of said contacts in each of said pairs being responsive to said one carrier while said one carrier is transferred by said conveyor to sequentially close said other contacts in each of said pairs whereby when said carrier reaches said one preselected outlet both of said contacts in said pair of said contacts corresponding to said one preselected outlet are closed and transfer is terminated in response to closure of both contacts in one of said pairs.

13. The device set forth in claim 10 wherein said conveyor direction selecting circuit means comprises a pair of stepping relays, one of said relays having a movable arm thereon and a plurality of contacts each of which corresponds to a respective inlet, means for sequentially moving said arm into and out of engagement with said contacts, and means responsive to said inlet identifying circuit means for terminating movement of said arm when said arm is in engagement with one of said contacts corresponding to said one inlet, the other of said stepping relays having a plurality of arms each of which corresponds to a respective inlet, each of said arms of said second stepping relay having a plurality of contacts arranged in a set with a contact in each of said sets corresponding to a respective outlet, means for electrically connecting each of said inlet contacts of said first stepping relay to a respective one of said arms of said second stepping relay, means for simultaneously moving said arms of said second stepping relay into and out of engagement with said outlet contacts of said second stepping relay, means responsive to said outlet identifying circuit means for terminating movement of said arms of said second stepping relay when said arms are in engagement with a contact corresponding to said one preselected outlet, first circuit means for initiating movement of said conveyor in one of said orbital directions, second circuit means for initiating movement of said conveyor in the other of said orbital directions, and means responsive to the position of said arm of said first stepping relay and the position of said arms of said second stepping relay for selectively energizing one of said first and second circuit means.

14. In a pneumatic tube conveyor system wherein carriers are routed from a plurality of incoming loops to a plurality of outgoing loops by a central exchanger in accordance with preselected outgoing loop designations on said carrier, a central exchanger comprising an endless conveyor to revolve carriers in opposite directions along a predetermined path, means for transferring carriers from at least one of said incoming loops to said conveyor at a predetermined location on said path, means for transferring carriers from said conveyor at positions spaced along said path with each position corresponding to a respective outgoing loop, drive means for moving said conveyor in opposite directions, and control means responsive to outgoing loop designations on said carriers to select either one direction or the opposite direction along said path so that the selected direction provides the shortest travel along said path from said predetermined location to a position corresponding to the outgoing loop designation on a carrier to be transferred by said conveyor, said control means further being operable to actuate said drive means and initiate movement of said conveyor in the direction selected by said control means.

15. The combination set forth in claim 14 wherein said means for transferring carriers to said conveyor comprises means for receiving carriers from each incoming loop and transferring carriers to said conveyor at different locations spaced along said path with each location representing a respective incoming loop, and said control means further comprises means for identifying an incoming loop that receives a carrier and correlating the identified incoming loop of the received carrier with outgoing loop designations on that received carrier to select either said one direction or said opposite direction for said drive means and said conveyor.

16. The combination set forth in claim 14 wherein said control means further comprises means for identifying outgoing loop designations on carriers before initiating transfer of the carriers by said conveyor, and means responsive to said outgoing loop identification on a received carrier and responsive to that received carrier during transfer of that received carrier by said conveyor to actuate said means for transferring a carrier from said conveyor when that received carrier reaches a position along said path corresponding to the outgoing loop designation on that received carrier.

17. In a pneumatic tube conveyor system comprising a plurality of pneumatic tube circuits for conveying carriers, a central exchanger having spaced apart inlets and spaced apart outlets connected to said tube circuits and means for transferring a carrier arriving at a given inlet to a preselected outlet to thereby route carriers from one tube circuit to the same or to another tube circuit, each exchanger inlet having a respective outlet associated therewith and spaced therebelow, said carrier transferring means comprising an endless conveyor movable in the vertical space between said inlets and said outlets, said conveyor having a plurality of receptacles spaced apart in accordance with the spacing of said inlets, each receptacle having an upper end for communicating with an inlet to receive a carrier and a lower end for communicating with an outlet to discharge a carrier, means including said receptacles defining respective paths connecting an inlet with its associated outlet for transferring carriers directly from an inlet to its associated outlet so that a carrier can gravitate from an inlet through a receptacle and into the associated outlet, gate means disposed in each of said paths to prevent direct gravity transfer from an inlet to its associated outlet and control circuit means actuated by carriers to selectively open and close said gate means so that when a carrier arrives from a circuit at one inlet and the arriving carrier is to be routed to a circuit connected to the exchanger outlet associated with said one inlet, said carrier may be gravity transferred by opening said gate means in the path between said one inlet and its associated outlet without moving said conveyor.

References Cited

UNITED STATES PATENTS

| | | | |
|---|---|---|---|
| 2,712,910 | 7/1955 | Goerlich | 243—29 |
| 2,797,057 | 6/1957 | Sindzinski | 243—16 |
| 2,865,578 | 12/1958 | Hennessy | 243—29 |

FOREIGN PATENTS 524,419  4/1931  Germany.

EVON C. BLUNK, *Primary Examiner.*

H. C. HORNSBY, *Assistant Examiner.*